Dec. 26, 1933.　　　S. R. OLDHAM　　　1,941,184
TORCH HOLDING AND ADJUSTING MECHANISM
Filed April 24, 1930　　　3 Sheets-Sheet 1

Dec. 26, 1933.  S. R. OLDHAM  1,941,184

TORCH HOLDING AND ADJUSTING MECHANISM

Filed April 24, 1930  3 Sheets-Sheet 3

INVENTOR
Samuel R. Oldham
BY
Byrnes, Townsend & Potter,
ATTORNEYS.

Patented Dec. 26, 1933

1,941,184

UNITED STATES PATENT OFFICE 1,941,184

TORCH HOLDING AND ADJUSTING MECHANISM

Samuel R. Oldham, Chicago, Ill., assignor to The Oxweld Railroad Service Company, a corporation of Delaware Application April 24, 1930. Serial No. 447,035

25 Claims. (Cl. 266—23)

This invention relates to holding and adjusting mechanisms for torches and other tools, and more particularly to an improved mechanism of this class which is adapted to be mounted on and used in conjunction with a machine for cutting or welding metals, an example of which is disclosed in U. S. Patent No. 1,554,101 of September 15, 1925.

In such machines it is desirable to mount the cutting or welding torch so that its tip may be readily positioned closer to or farther away from the work and at various angles to the work, in order that the cutting or welding flame may be so applied to the work as to function most effectively. One of the objects of this invention is to provide a holding and adjusting mechanism for torches and other tools that will meet this requirement. Other objects and the novel features of the invention will be apparent from the following description taken with the accompanying drawings, in which.

Figure 1:
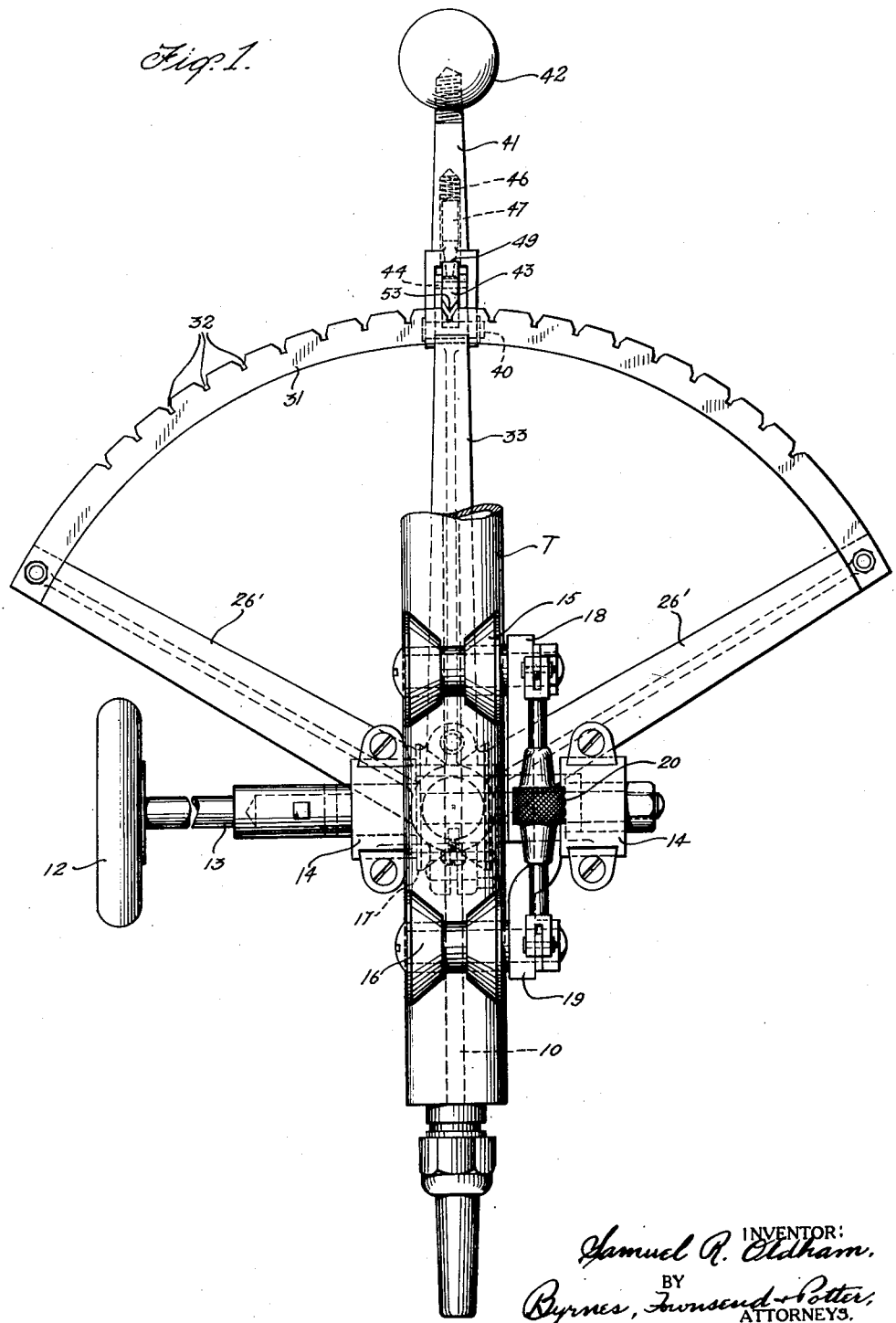
Figs. 1 and 2 are, respectively, front and side elevational views of an improved holding and adjusting mechanism embodying the invention.

While the improved mechanism is particularly adapted for holding and adjusting a tool, such as a gas cutting or welding torch, it will be understood that the utility of certain features of the invention is not limited to the preferred application herein disclosed.

Referring to the drawings, the tool holder is provided with means for adjusting a tool, such as the oxyacetylene metal cutting torch T, and retaining it in any one of its adjusted positions, at a predetermined distance from the work and at a predetermined angle to the work. Suitable means may be provided to lower or raise the torch T or other tool to set its tip or lower end nearer to or farther away from the work. As shown, the torch may be provided with a rack 10 extending longitudinally thereof, and a pinion 11 that meshes with the rack may be rotated in either direction by turning the handle 12, to raise or lower the torch, as desired. The pinion 11 is fast on a spindle 13, which carries the handle 12, and is journalled in bearings 14, 14 in the forked part of the torch holder H.

The torch may be supported laterally and guided longitudinally by a set of three rollers,—a pair of spaced rollers 15 and 16 bearing against one side of the torch and a third roller 17 bearing against its other side at a point about half way between the rollers 15 and 16; the three rollers constituting gripping means for holding the torch adjustably above the work. These rollers may be peripherally grooved or, as shown, may each consist of frustro-conical sections having their peripheral faces inclined toward one another to provide groove-like surfaces to fit the torch and support it laterally. The sections of the roller 17 may be rotatably mounted on the spindle 13 or on bushings at opposite sides of the pinion 11; and the rollers 15 and 16 may be rotatably mounted at the outer ends of arms 18 and 19 which are pivotally supported on the spindle 13. The arms 18, 19 are inclined to each other and a turn-buckle 20 or other adjustable means may be connected to the spaced outer ends thereof to spread them and the rollers 15, 16 apart or draw them closer together and thereby vary the size of the passage between the rollers 17 and the pair of rollers 15, 16, to accommodate the holder to torches of different cross-sectional sizes.

The torch holder H has a stem or extension 22 whereby it may be mounted on a suitable support or bar 23, such as the outer end of a horizontal torch-supporting arm secured to the upper carriage of an automatic shape cutting machine similar to the one shown in U. S. Patent No. 1,554,101. As shown, the stem 22 projects into a socket 24 formed in the tubular base 25 of a quadrant supporting member 26. One end of the tubular base 25 fits tightly into the hollow end of the supporting arm 23 and is held in place therein and braced by a tie-rod 27 which is secured at one end to a suitable standard or other part on the carriage of the cutting machine, and has its other end bolted at 28 to a lug on the quadrant support 26, so as to provide a rigid support for the torch and its adjusting mechanism. Suitable means may be provided to hold the stem 22 against endwise movement in the socket 24 and yet permit the same to turn a limited distance about its axis. For this purpose the stem 22 is provided with an arcuate slot 29 which is adapted to receive the inner end of a set screw or pin 30 that is secured to the base 25. A grease cup 31 may also be provided to lubricate the bearing surfaces of the socket and the stem.

The quadrant supporting member 26 has a pair of angularly disposed arms 26′ formed in one piece with the tubular base 25 and extending upwardly radially to the axis of said base, and a segmental quadrant or indexing device 31 is secured to the outer ends of these radial arms. The quadrant 31 consists of a metal bar which has a series of recesses therein, such as the notches 32 along its upper edge, and is provided with suitable markings opposite such notches whereby the angular position to which the torch is to be set may be determined readily.

In order to move the torch to any desired angular position on either side of a vertical position relatively to the work, the torch holder H may be turned a limited distance in either direction about the axis of the stem 22. A compound lever may be used for this purpose,—one lever 33 of which has a split lower end or clamp 34 that fits around the stem 22 and is secured thereto by a bolt and nut 35. The clamp 34 is desirably confined between one end of the tubular base 25 and a shoulder 22' on the stem 22. The upper end of the lever 33 is provided with a surface 36 which is slidable along the lower edge of the quadrant 31. An upwardly projecting lip 37 on one side of the surface 36 engages the front face of the quadrant 31, and an upwardly projecting bearing extension 38 on the other side of the surface 36 engages the rear face of the quadrant. The bearing extension 38 has a hole 39 to receive a pin 40 for pivotally supporting the lower end of an operating lever 41 which has a handle 42 at its upper end. The bearing extension 38 has a forked portion above the hole 39, and the lower end of the operating lever 41 is also forked and straddles the forked upper end of the lever 33, each prong of the forked end of lever 41 having a hole 41' to receive the pivot pin 40. The pivotally-connected levers 33 and 41 together operate as a compound lever for adjusting and setting the torch holder in any predetermined position along the quadrant 31. To latch or unlatch the compound lever at any particular notch on the quadrant, the upper lever 41 is swingable relatively to the lower lever 33, perpendicular to the plane of the quadrant. When unlatched, the connected levers may be moved quickly in either direction along the quadrant, and the torch holder secured to lever 33 will position the torch as desired.

Suitable means may be provided to positively retain the compound lever, and the torch adjusted thereby, at any angular position, and for this purpose a suitable releasable latch or pawl, carried by the compound lever, is adapted to be engaged with or disengaged from any one of the notches 32. As shown, the notch-engaging pawl comprises a plate 43 which is pivotally mounted at 44 within the forked upper end of the lever 33 so that the plate 43 may be rockable in a plane transverse to that of the quadrant 31. The plate 43 and quadrant 31 constitute interengaging means, the former of which may be rocked into latching and unlatching positions by swinging the lever 41 about the pivot 40. To facilitate the operation of the plate 43 by the lever 41, the latter is counterbored as at 45 to provide a socket to receive a spring 46 and a plunger 47. The spring 46 yieldingly presses the plunger against the upper edge 48 of the latch plate 43. The edge 48 is slightly inclined downwardly toward the forward edge of the plate 43, and lugs 49 and 50 are provided at the opposite ends of the edge 48 for engagement by the plunger 47 when lever 41 is swung to latching and unlatching positions, respectively. At the forward end of the lower edge 52 of the plate 43 there is a lug 53, which is wedge shaped to facilitate its entry into the notches 32. At the rear end of the edge 52 there is a lug 54 which serves as a stop by engaging the rear side of the lever 33 when the plate 43 is swung into unlatching position, thus limiting the unlatching movement of the latch plate as well as the lever 41. The lower edge 52 may be curved so as to cooperate with a correspondingly curved bearing surface 55 at the bottom of the forked part of the lever 33, to assist in supporting the plate 43 in both its latched and unlatched positions.

Figure 2:
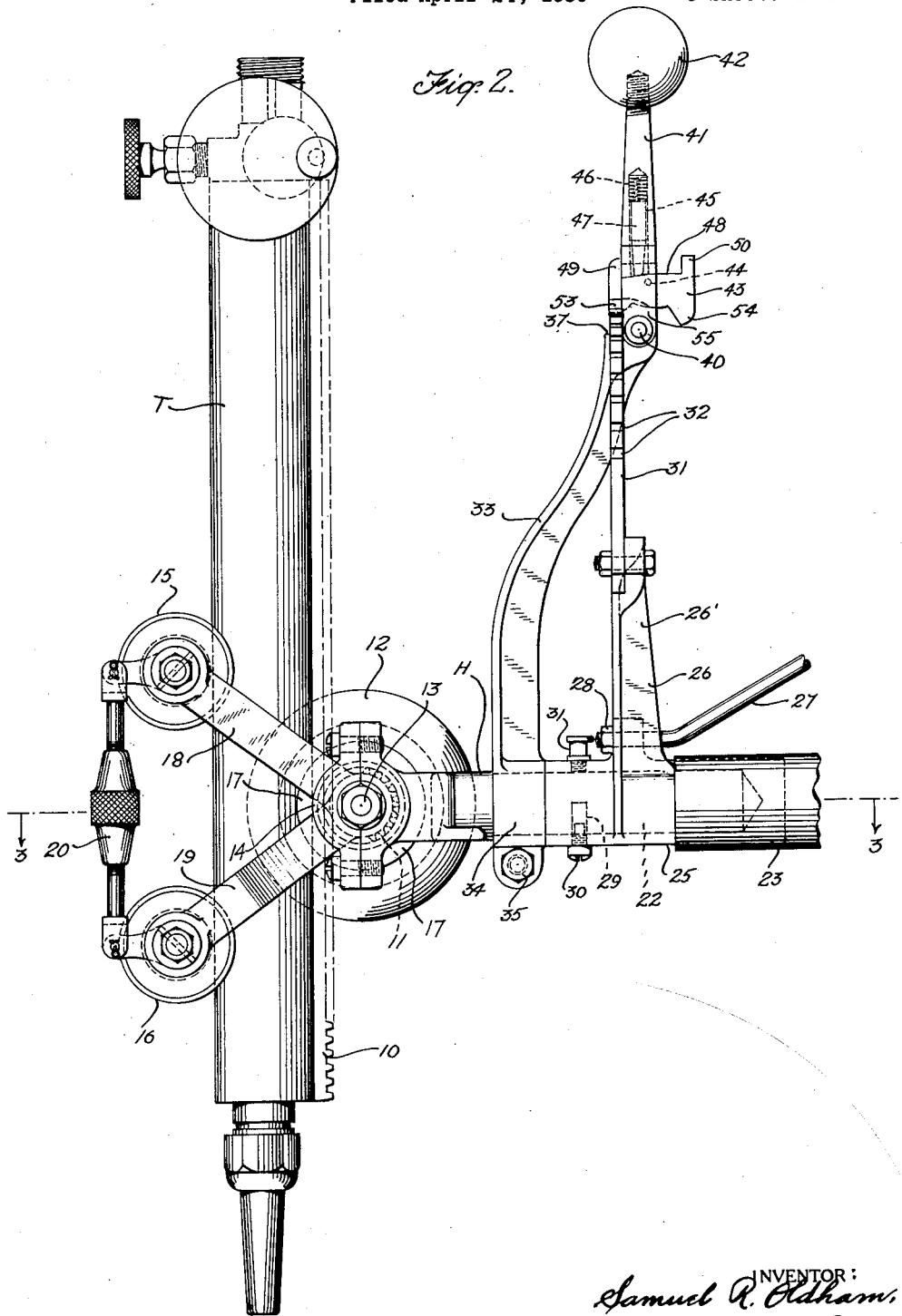
Figure 3:
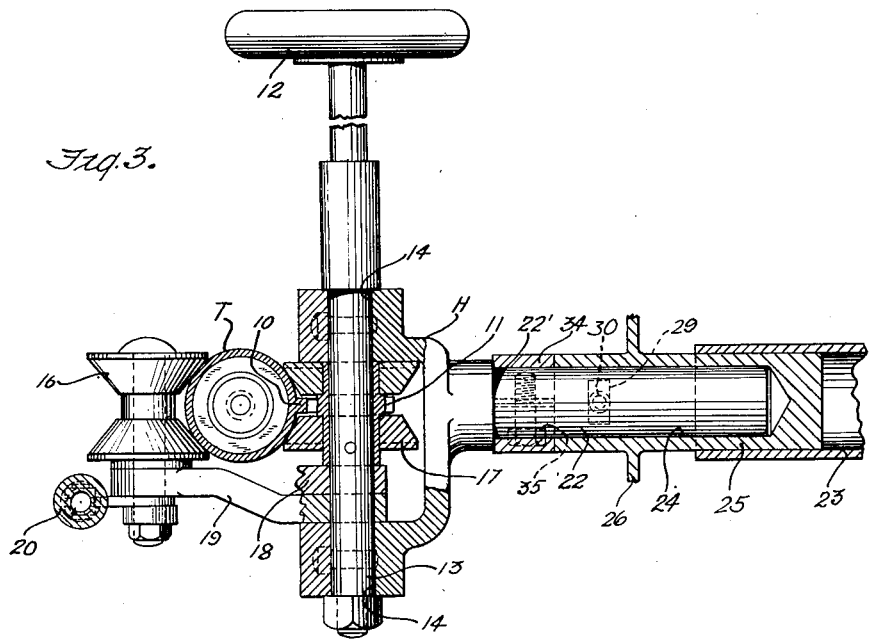
Fig. 3 is a horizontal section of the same, taken on the line 3—3 of Fig. 2.
Figure 4:
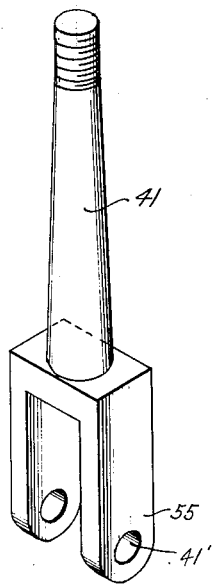
Figs. 4, 5 and 6 are detail views.
Figure 5:
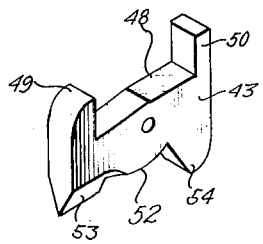
Figure 6:
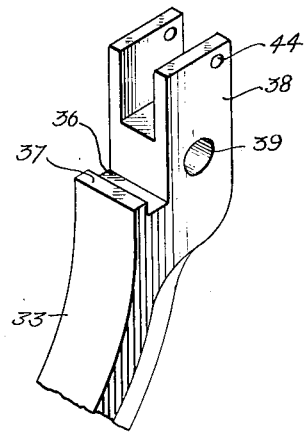

The operation of the improved torch supporting and adjusting mechanism will be apparent from the foregoing description. It is evident that turning the handle 12 will raise or lower the torch, as desired. By swinging the lever 41 to the right, as viewed in Fig. 2, the latch plate 43 may be rocked so as to disengage the lug 53 from a notch 32 in the quadrant plate 31; and when so released, the compound lever and the torch secured thereto may be moved in either direction along the quadrant 31 to a predetermined position and there again set in a latched position by swinging the lever 41 to the left, thus retaining the torch in its adjusted position.

The movement of the compound lever and torch between any two given positions within the range of movement may be effected substantially instantaneously through lever 33 when the lug 53 is disengaged from the notches in the quadrant thereby rendering it possible to quickly reverse the angular position of the torch with respect to a medial position, without having to extinguish the torch and without danger of materially heating the metal intermediately of the initial and final position of the torch as in moving the torch back and forth lengthwise of the seam.

While I have shown and described one particular embodiment of the invention, it is to be understood that various changes may be made in the construction disclosed without departing from the spirit of the invention.

I claim:

1. The combination with a tool holder, of means whereby said holder may be adjusted to and retained in any one of a number of positions, such means comprising an element having a series of recesses, a pawl, and means operable to adjust said holder and to engage or disengage said pawl and any one of said recesses.

2. The combination with a tool holder, of means whereby said holder may be adjusted to and retained in any one of a number of positions, such means comprising a bar having a series of recesses, a pawl, and a lever connected to said holder and operable to adjust the latter and to engage or disengage said pawl and any one of said recesses.

3. The combination claimed in claim 2, in combination with a plunger mounted on said lever and yieldingly bearing against said pawl.

4. The combination with a tool holder including means for adjusting a tool toward or away from the work, of lever controlled means operable to adjust said holder and such adjusting means to position the tool in any one of a number of angular positions relatively to the work and means for determining the angular setting of said holder in any one of said positions.

5. In a tool holding and adjusting means, the combination of rotatable means for holding a tool and adjusting the same toward or away from the work, a lever operable to adjust such holding means to position the tool thereon in any one of a number of angular positions relatively to the work and means for determining the angular setting of said holding means.

6. The combination of a tool holder, means whereby said holder is rockably supported, a compound lever for rocking said holder comprising a member secured to the holder and a handle element pivoted on said member, and cooperating devices for retaining said lever and said holder in any one of a number of adjusted positions, one of said devices being operable by said handle element.

7. The combination of a tool holder, means whereby said holder is rockably supported, a compound lever for rocking said holder comprising a member secured to said holder and a handle element pivoted on said member, a fixed device, and a second device movable by said handle element to interlock or disengage said devices.

8. The combination defined in claim 7, wherein said fixed device comprises a segmental bar having a series of recesses, and said second device comprises a pawl pivoted on said member and adapted to interlock with said recesses.

9. In a tool holder, the combination with a bar having a recess, of a compound lever comprising two members pivotally connected together, a pawl rockably mounted on one of said members and adapted to engage said recess, and means whereby said pawl is operable by the other of said members for engaging and disengaging with the recess.

10. The combination with a bar having a recess, of an adjustable compound lever comprising two members pivotally connected together, a pawl pivoted on one of said members and adapted to engage in said recess, the other of said members constituting a handle, and means whereby such handle member is adapted to rock said pawl about a fulcrum into and out of engagement with said recess by a movement of the handle in a plane transversely of the bar.

11. A torch holding and adjusting mechanism comprising means for adjusting a torch toward and away from the work, and means for moving the torch quickly between angularly spaced positions, latching means for setting such torch in any one of a number of predetermined different angular positions relative to the work.

12. A torch holding and adjusting mechanism comprising means for adjusting a torch lengthwise of its axis toward and away from the work, a lever for adjusting said torch by a substantially instantaneous movement about another axis extending transversely of the torch axis, and latching means for retaining said lever in any one of a number of positions.

13. A torch holding and adjusting mechanism comprising means including a rack and a pinion for adjusting a torch lengthwise of its axis toward and away from the work, and means including a rockably mounted pawl and a lever for operating the pawl in setting such torch in any one of a number of different angular positions relative to the work.

14. A torch holding and adjusting mechanism comprising a torch holder turnable about an axis extending transversely of the axis of a torch carried by said holder, means for adjusting said holder about said transversely extending axis, and means including a lever operated latch for retaining such holder in any one of a number of adjusted positions.

15. A torch holding and adjusting mechanism comprising an angularly adjustable torch holder, and means for adjusting said holder and retaining the same in any one of a number of positions, such adjusting means including a lever, an indexing device, and a releasable pawl operable by said lever and cooperating with said device.

16. A torch holding and adjusting mechanism comprising an angularly adjustable torch support, a lever for adjusting said support, and means including a pawl for retaining said lever in any one of a number of positions.

17. A torch holding mechanism comprising a pair of rollers adapted to bear against the same side of a torch, and a third roller adapted to bear against the other side of said torch at a point about half way between the bearing points of said pair of rollers.

18. A torch holding mechanism according to claim 17, wherein said pair of rollers are adjustable toward or away from one another.

19. A torch holding mechanism according to claim 17, in combination with means for propelling a torch in either direction relatively to said rollers.

20. The combination with a tool holder including means for adjusting a tool toward or away from the work, of lever controlled means operable to adjust said holder and such adjusting means within a single plane to position the tool in any one of a number of predetermined angular positions relatively to the work.

21. In a tool holding and adjusting means, the combination of rotatable means for holding a tool and adjusting the same toward or away from the work, and a lever operable to adjust such holding means within a single plane to position the tool thereon in any one of a number of predetermined angular positions relatively to the work.

22. A torch holding and adjusting mechanism comprising means including a rack and a pinion for adjusting a torch lengthwise of its axis toward and away from the work, and means including a lever for setting such torch in any one of a number of different angular positions within a single plane relative to the work.

23. A torch holding and adjusting mechanism comprising an angularly adjustable torch support, a lever for adjusting said support, and means including a pawl for retaining said lever in any one of a number of positions within a single plane.

24. The combination with a torch and a holder therefor, a support for the holder to which it is pivotally connected for swinging between various positions on opposite sides of a medial position, lever means connected with the holder for quickly swinging the torch between such positions and for effecting the locking of the torch in such positions.

25. The combination with a torch for applying heat at high temperature to a metallic surface and a holder for the torch, a support for the holder pivotally connected therewith so as to permit the torch to be swung quickly between any two of a number of predetermined positions within a given range, means for swinging the torch between such positions, and means for holding the torch in any one of such positions.

SAMUEL R. OLDHAM.